United States Patent [19]

Gebo

[11] 4,337,924
[45] Jul. 6, 1982

[54] POWER PULLING ARRANGEMENT

[76] Inventor: George B. Gebo, 14738 Keswick St., Van Nuys, Calif. 91405

[21] Appl. No.: 273,593

[22] Filed: Jun. 15, 1981

[51] Int. Cl.³ .................................... E21C 29/16
[52] U.S. Cl. .............................. 254/134.3 R; 254/285
[58] Field of Search ............... 254/134.3 FT, 134.3 R, 254/338–340, 283–286, 290–292

[56] References Cited

U.S. PATENT DOCUMENTS

| | | | |
|---|---|---|---|
| 3,072,382 | 1/1963 | Jones | 254/134.3 R |
| 3,265,360 | 8/1966 | Tax | 254/285 |
| 3,291,449 | 12/1966 | Hughes | 254/134.3 FT |
| 3,968,952 | 7/1976 | Newell | 254/134.3 R |
| 4,002,321 | 1/1977 | Shaw | 254/285 |

Primary Examiner—Robert C. Watson

Attorney, Agent, or Firm—Roger A. Marrs

[57] ABSTRACT

A cable or wire pulling apparatus is disclosed herein having a load bearing member comprising a pair of extendable stanchions joined at one end by a cross brace and at their other end by a common support base. Midway between the brace and the base, a pair of cooperating capstans are operably carried on the respective stanchions. Upper and lower pulleys which may be selectively used are carried on opposite ends of each stanchion to act as pull rope guides. A pair of pull ropes are trained over selected pulleys and are joined at their adjacent free ends to a common fitting attached to a bundle of wires, conduit or cable intended to be pulled. Each capstan is provided with a motor drive operably coupled thereto by a gear reduction arrangement.

6 Claims, 3 Drawing Figures

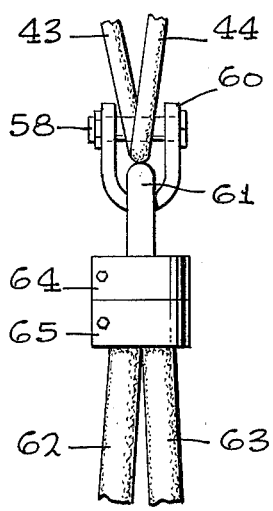
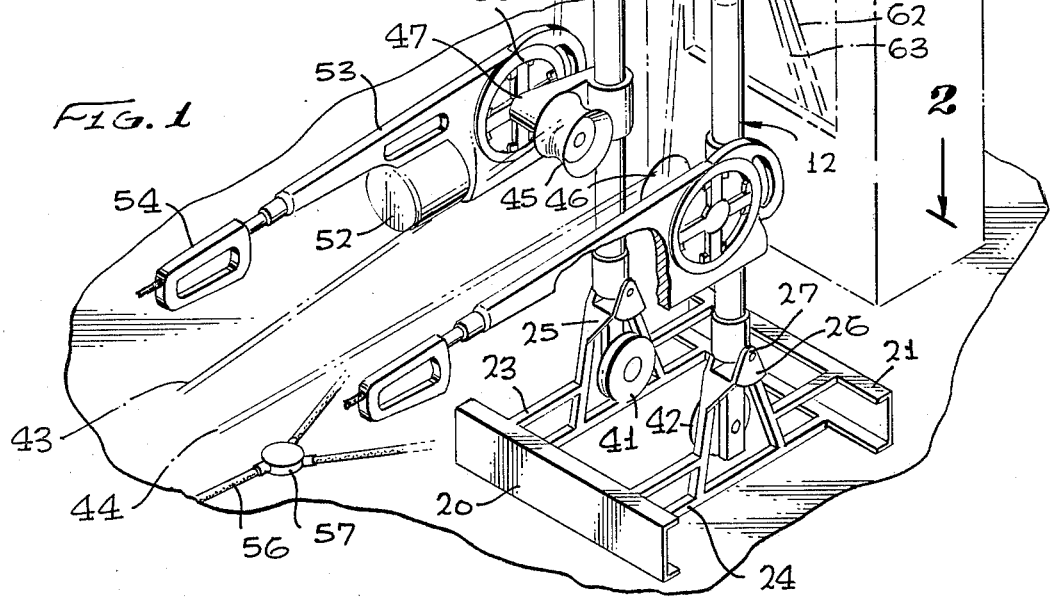
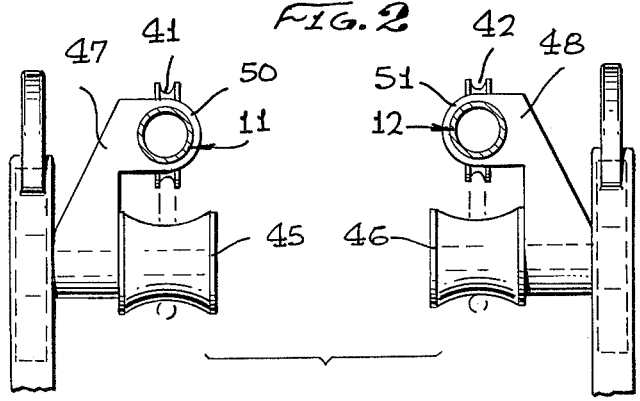

POWER PULLING ARRANGEMENT

BACKGROUND OF THE INVENTION

1. Field of the Invention

The invention relates to a power pulling arrangement and has particular utility in the electrical field as an aid to pulling cable and wire or cable and wire combination through installed conduit.

2. Brief Description of the Prior Art

Persons skilled in the construction field will be familiar with the fact that sound safety practice requires that all current carrying cable and wire be installed in appropriately sized conduit which, for example, may be arranged to interconnect service entrance box and distribution box centers. Usually employed construction procedure requires that the service entrance and distribution box centers, the interconnecting conduit and like be placed in the new building at an early stage in the construction thereof. At this point in such construction the boxes and conduit are empty and the electrical conductors are installed at a later stage of the construction. In large commercial and industrial building, the conduit employed may be required to have a diameter of two to six inches or even greater and when installed will be bent at various angles, offset, elbowed or the like.

The conductors employed in conduit of the sizes here under consideration frequently have nominal diameters of an inch or more. Material economy dictates that as many conductors as possible be placed in each conduit. The length of conduit run is, of course, variable depending upon the physical features of the building, however, runs of several hundred feet are not uncommon. These facts, namely, the length and erratic path of the conduit run, the size and number of conductors placed in each conduit make the job of pulling the conductors through said conduit an extremely difficult one.

To better understand the herein disclosed invention brief consideration should be given to the procedure followed in conductor installation. Initially, a very light lead line is fed through the conduit run. This may be accomplished by first shooting a small weight with the line attached thereto through the conduit. The lead line is then connected to a steel cable or pull rope (manila or plastic) which is fed through the run. A mechanical connection is then provided between the cable or rope and the conductors. The cable or rope and the connected conductors are then pulled through the conduit. Where metal conduit is employed a steel pull cable may be used. Recently however aluminum pipe has been employed in large diameter conduit. It has the advantage of light weight and ductility which facilitates bending and installation. With aluminum conduit a rope pull line is more desirable in that a steel line tends to gouge the relatively soft aluminum conduit surface.

To develop the pulling force required, prior art practice has dictated that a wide variety of force multiplying devices be used. For example, block and tackle, windlass and powered winches have been used. Because of the wide difference of the physical features of each installation, the equipment referred to above was usually specially rigged for each job. Set up time alone, therefore, represented an important cost factor for each job. Frequently, set up time could not even be estimated accurately before the job was actually begun. In many cases special temporary scaffolding would have to be built before conductor pulling could commence.

Problems and difficulties have been encountered when employing such force multiplying devices which stem largely from the fact that the pulling force may exceed the tensile strength of the pull line which will sever or break the pull line. Such an occurrence may result in injury to nearby workmen or damage to property.

Therefore, a long standing need has existed to provide a cable or wire puller which provides increased pulling power with an extra measure of safety.

SUMMARY OF THE INVENTION

Accordingly, the above problems and difficulties are obviated by the present invention which provides a novel cable or wire pulling apparatus comprising a load bearing member having at least a pair of extendable upright members or stanchions joined at a selected end by a cross brace and at their opposite or other end by a common support base. Cooperating capstan means are operably mounted on each of the respective stanchions between the brace and the base and pulley means are carried on opposite ends of each of said stanchions serving to act as pulley rope guides. A pair of pull ropes are trained over selected pulley means and are joined at their free ends by a common fitting removably attached to a wire bundle, conduit or cable intended to be pulled. Motor means are operably connected to each of the respective capstans or capstan means by a suitable gear reduction arrangement whereby the pull rope may be powered via the respective capstans for gaining force multiplication.

Therefore, it is among the primary objects of the present invention to provide a novel power pulling apparatus employing motor means for driving capstans and pull ropes in order to gain power multiplication.

Another object of the present invention is to provide an improved power pulling arrangement which includes a tandem load support having a common base and upper brace means whereby increased pulling power may be employed via pull ropes and capstans to a wire bundle, cable or conduit intended to be pulled.

Still a further object of the present invention is to provide a novel power pulling apparatus which not only provides power means for increasing the power multiplication force but which provides safe operation by evenly distributing loads between a pair of pull ropes driven by separate and individual power means.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a front perspective view of the novel power pulling apparatus of the present invention illustrating the apparatus in actual use;

FIG. 2 is a transverse cross-sectional view of the power pulling apparatus shown in FIG. 1 as taken in the direction of arrows 2—2 thereof; and FIG. 3 is an enlarged view of the fitting attached to the adjacent free ends of the pair of pull ropes.

DESCRIPTION OF PREFERRED EMBODIMENT

Referring to FIG. 1, the novel power pulling apparatus of the present invention is illustrated in the general direction of arrow 10 which includes a pair of parallel load bearing members or stanchions indicated by numerals 11 and 12 respectively. The stanchions are arranged in fixed parallel spaced apart relationship and are extendable in a telescoping fashion by means of tubes 13 and 14 which slide within the bore of the lower tubes of each stanchion. When the proper height has been achieved, pins, such as pin 15 associated with stanchion 12 is introduced through indexed or aligned holes associated or carried in the tube 14 so that the tube will not fall back into the lower portion of the stanchion.

The upper end of the stanchions 11 and 12 are maintained in fixed spaced apart relationship by means of a cross brace 16 which is held onto the stanchions by means of clamps 17 and 18 which are secured to the cross brace 16 by any suitable means such as bolts or the like. The opposite ends of the pair of stanchions 11 and 12 are supported on a base comprising a pair of channels 20 and 21 which are arranged in fixed spaced apart relationship and are joined together and maintained in such relationship by braces 22 and 24. Therefore, a square base is provided since the channels and braces are arranged at 90 degree angles with respect to one another. The braces 22 and 24 include boss elements 25 and 26 which include yokes for pivotally supporting the lower end of the stanchions 11 and 12. Such a relationship is indicated by numeral 27 associated with stanchion 12 and boss element 26. The opposite end of each of the stanchions and carried on tubes 13 and 14 respectively, there is provided a yoke as indicated by numerals 30 and 31 for rotatably mounting upper pulleys indicated by numerals 32 and 33 respectively. Access is gained to the pulleys by rotatably moving closure elements 34 and 35 out of the way. Such closure elements prevent the pull ropes from jumping out of or leaving the pulleys and the yoke assemblies. Outwardly projecting from each of the yoke elements carried on tubes 13 and 14, there is provided a pair of stand-offs as indicated by numerals 36 and 37. The stand-offs are arranged in fixed parallel relationship and are cantilevered outwardly from the stanchions so as to engage or butt against a wall or other structure such as an electrical cabinet 40 as illustrated.

The lower end of each of the stanchions and rotatably carried on the boss elements 25 and 26 there is provided lower pulleys 41 and 42 which may be selectively employed for guiding pull ropes between respective capstans and the work intended to be pulled in the same manner as may pulleys 32 and 33 be employed. The pulleys may be selectively used in sets of upper or lower pulleys depending on the angle of pull desired and available.

Pulling is achieved by means of a pair of pull ropes 43 and 44 which are trained about capstans 45 and 46 which are rotatably carried in journals on a mounting fixture such as indicated by numerals 47 and 48 in FIG. 2. The fixtures 47 and 48 are coupled to each of the respective stanchions 11 and 12 by means of a collar arrangement taking the form of a sleeve coupling as indicated by numerals 50 and 51 respectively.

A feature of the present invention resides in powering the capstans by motor means as indicated by numeral 52 which is carried on a frame 53 having a handle 54 at one end with a suitable trigger for operating the motor and having a gear reduction arrangement 55 at its opposite end. The gear reduction drive 55 is directly and operably coupled to the capstan 45 so that the capstan will turn accordingly when the trigger has been depressed and the motor energized. It is to be understood that a duplicate motor, handle and trigger, and gear reduction arrangement are provided for the capstan 46 in an identical form. Power for operating the motors of the respective power drive is achieved from a power cable 56 which terminates in a junction box 57 where separate leads are then directed to the handles 54 of the respective power drives.

As shown more clearly in FIG. 2, the capstans 45 and 46 are adjacent to one another and lie on a common central turning axis.

Referring now in detail to FIG. 3, it can be seen that the pull ropes 43 and 44 terminate in loops coupled about a pin 58 passing through the legs of U-shaped fixture 60. The fixture in turn is coupled to a cable eyelet 61 which is suitably and conventionally coupled to a pair of cables 62 and 63 by means of clamps 64 and 65. The cables or wire bundles indicated by numerals 62 and 63 are intended to be pulled by the pull ropes 43 and 44 and for purposes of illustration, the wire bundles or cabling is intended to terminate in the electrical box 40. The box 40 includes a central opening 66 through which the bundle of wires or cabling 62 and 63 extends while being pulled by the pull ropes 43 and 44. Therefore, it can be seen that the pair of pull ropes are employed and that they cooperate by joining at a common pull point which is at the fixture 60. In this manner, the pulling force of each pull rope is joined to pull the bundle of wires or cabling into the electrical box 40. For this purpose, the apparatus is orientated so that the pull ropes 43 and 44 are best guided from each of their respective capstans 45 and 46 to the upper pulleys 32 and 33 and then downwardly to the fixture 60.

Therefore, it can be seen from the foregoing that the pulling apparatus of the present invention provides an improved apparatus which provides not only motorized power for effecting the pulling force but which multiplies this force by employing double pull lines 43 and 44. By such an arrangement, safety in use is greatly improved since adequate power is employed without applying the total applied force to any one pull rope. Such force would normally cause a single pull rope to exceed its elasticity or tensile strength and thereby cause the line to sever.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a power driven wire or cable pulling device, the combination which comprises:
   a load bearing member having a pair of substantially parallel, spaced apart, extendable stanchions;
   a support base pivotally attached to said stanchions at a selected end thereof;
   a cross brace having its opposite ends secured to each of said stanchions respectively located in close proximity to the end of said stanchions opposite to the end attached to said support base;

a pair of cooperating capstons operably carried on said stanchions respectively mid-way between said cross brace and said support base;

upper and lower pulleys carried on opposite ends of each of said stanchions respectively;

a pair of pull ropes trained over selective ones of said pulleys associated with each of said pair of stanchions and further, trained over each of said capstons respectively;

power means operably coupled to each of said capstons for driving said capston at a predetermined and selected speed; and a fitting common to said pair of pull ropes at adjacent ends thereof for jointly applying the combined loads of said pull ropes to a wire or cable bundle intended to be pulled.

2. The invention as defined in claim 1 including:

a gear reduction mechanism operatively coupling said power means to each of said respective capstons.

3. The invention as defined in claim 2 including:

a pair of stand-offs carried on each of said stanchions for holding said load bearing member away from a supporting structure.

4. The invention as defined in claim 3 including:

an electrical power circuit connected to each of said respective power means via a common junction box.

5. The invention as defined in claim 4 wherein:

said support base comprises a pair of channels in parallel, spaced apart relationship joined together by a pair of brace members having their opposite ends secured to said brace members.

6. The invention as defined in claim 5 wherein:

said power means includes elongated handle means cantilevered outwardly from electric motors; and trigger means carried on said handles and operably coupled to said motors for connecting same to said electrical power circuit.

* * * * *